No. 716,914. Patented Dec. 30, 1902.
M. MAHLEN.
WRENCH.
(Application filed Sept. 30, 1901. Renewed May 28, 1902.)
(No Model.)
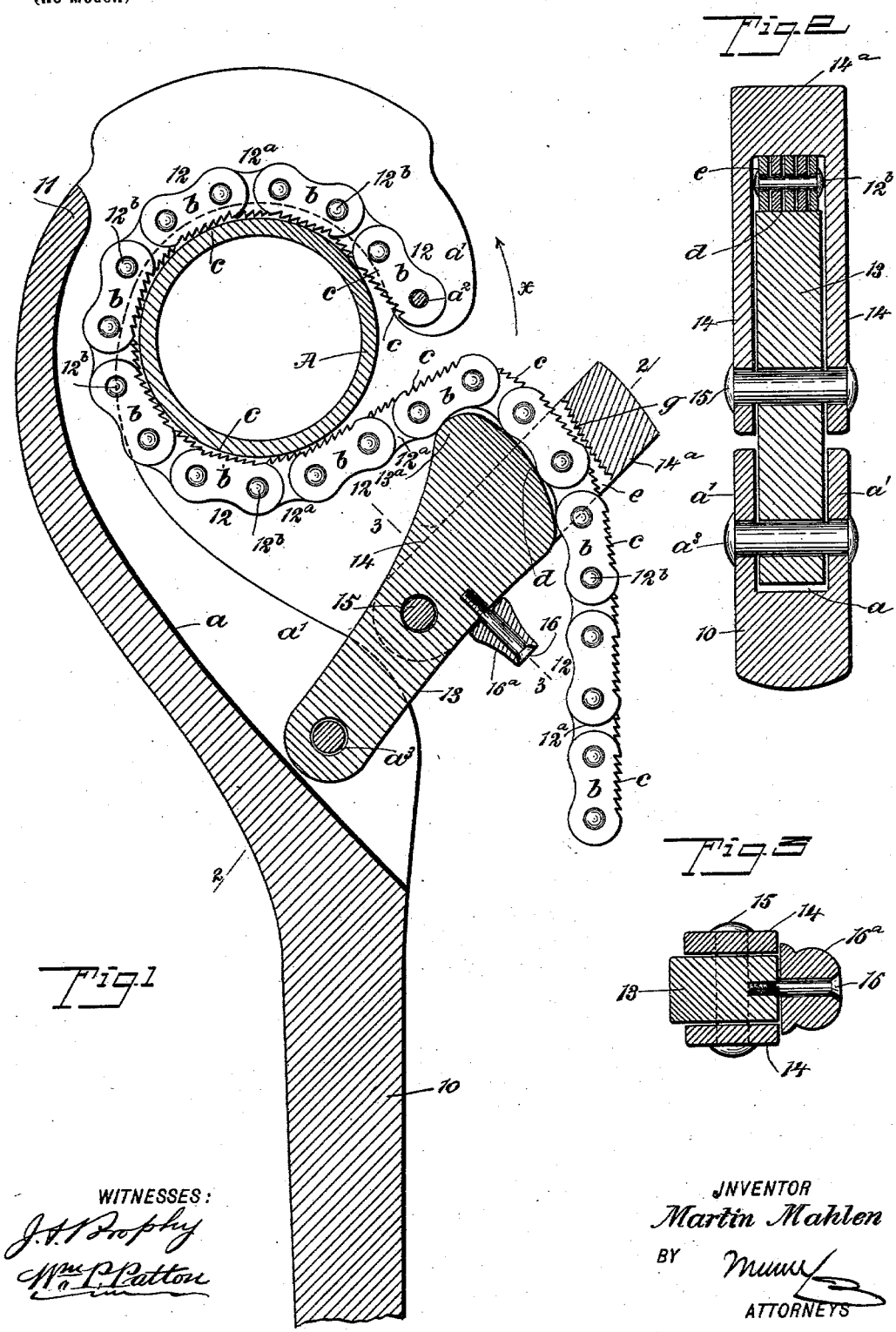
WITNESSES:
INVENTOR
Martin Mahlen
BY
ATTORNEYS

United States Patent Office.

MARTIN MAHLEN, OF OSAKIS, MINNESOTA.

WRENCH.

SPECIFICATION forming part of Letters Patent No. 716,914, dated December 30, 1902.

Application filed September 30, 1901. Renewed May 23, 1902. Serial No. 108,744. (No model.)

*To all whom it may concern:*

Be it known that I, MARTIN MAHLEN, a citizen of the United States, and a resident of Osakis, in the county of Douglas and State of Minnesota, have invented a new and Improved Wrench, of which the following is a full, clear, and exact description.

This invention relates to a class of lever-wrenches employed to screw or unscrew pipes into or from their fittings or bolts and studs which need adjustment by turning their bodies.

The object of my invention is to provide a lever-wrench of the class indicated which embodies a multiple-linked chain as an element, the chain having a roughened surface for engagement with a pipe or bolt body and also novel coacting features of construction which serve to bind the chain on the object to be turned when the lever is moved in one direction and release the chain by an opposite movement of the lever.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a partly-sectional side view of the improved wrench embracing the body of a pipe. Fig. 2 is a longitudinal sectional view substantially on the line 2 2 in Fig. 1, and Fig. 3 is a transverse sectional view substantially on the line 3 3 in Fig. 1.

The body of the lever 10 has length sufficient for effective use, and at one end, which is the head of the lever, an integral hook 11 is formed, which is recessed or concaved interiorly, as indicated at $a$ in Fig. 1. A chain of novel construction is provided, each main link 12 $12^a$ of which is composed of a plurality of flat link members $b$, having rounded ends and side edges shaped substantially as represented in Fig. 1. Sundry links 12 have their link members $b$ spaced apart by the intervening end portions of the link members of the main links $12^a$, and near the ends of the link members $b$, comprising each segmental main link 12 $12^a$, transverse pivots $12^b$ are loosely secured in alined perforations in said lapped ends. It will be seen that the composite links 12 $12^a$ afford a very strong and durable chain, having a considerable thickness, and, as shown, the similar side edges of the link members or sections $b$ of each main link 12 $12^a$ have serrations $c$ formed thereon.

One end of the chain is pivoted at $a^2$ between the sides $a'$ of the recess $a$ in the head 11, the teeth $c$ on the chain-link members $b$ facing inwardly, so as to be adapted to have contact with the exterior of a cylindrical pipe A, as shown in Fig. 1. Between the walls $a'$ of the recess $a$, near the body of the lever 10, one end of a dog 13 is pivoted by a bolt $a^3$, and on one side of the dog a toe $13^a$ projects toward the head 11 of the lever 10. The end of the toe $13^a$ is convexly shaped, as shown, to adapt it for proper engagement with outer edges of the chain-links 12 $12^a$, that may be disposed opposite the toe, and the free outer end of the dog is also rounded, as represented at $d$ in Fig. 1.

A chain-clamp comprising a block having two parallel legs 14, spaced apart by a head portion $14^a$, is loosely mounted upon the dog 13 by a pivot-bolt 15, that passes transversely through the legs 14 near the free ends of the latter, and a suitable space $e$ intervenes the inner surface of the head-wall $14^a$ and the end $d$ of the dog to permit the passage therethrough of the chain comprising the main links 12 $12^a$, as represented in Figs. 1 and 2. As shown, the inner surface of the head-wall $14^a$ is slightly convex and serrated transversely, so that the teeth $g$ thereon may have contact with the adjacent edges of the chain-links and prevent the chain from slipping when the wrench is in use.

It will be seen that if the clamping-block is rocked on the dog 13 away from the toe $13^a$ the chain may be freely drawn through the passage $e$ and adjusted to closely contact with the body of a pipe A or a bolt-body, and when a proper adjustment of the chain is effected and the clamp is held alined with the dog a pull on the lever 10, which draws the dog and clamping-block in direction of the arrow $x$, will cause the clamp to bind on the chain and the dog to press its toe $13^a$ upon an adjacent chain-link, which will so cramp the chain on the pipe as to prevent it from slipping, and thus adapt the wrench to turn the pipe in a direction indicated by the arrow $x$.

A detent-button is provided to hold the clamp from rocking backward and consists of a winged head-piece $16^a$, through which a screw 16 passes, the head of the screw bearing on the outer end of the head-piece and the threaded portion of the screw engaging a threaded perforation in the dog 13.

In service when the clamp on the dog 13 is rocked toward the wrench-head 11, so as to aline its edges with those of the dog, the wings of the head-piece $16^a$ should be turned transversely of the dog-body, so as to bear upon the edges of the legs 14, which will retain the clamp alined with the dog, so that these parts may together be rocked toward the wrench-head 11 for constriction of the chain upon a pipe or bolt that is to be turned by the wrench.

One of the important features of the wrench consists in the serration of the edges of the chain-links, which prevents them from slipping on the body of a pipe or bolt when in use, thus obviating a defect incidental to chain wrenches as heretofore constructed. The rockable dog and adjustable clamp on said dog are other essential novel details of the invention.

It will be seen that the improved wrench is very convenient to apply and use, is adapted to operate effectively on bolts or pipes of various diameters, and is capable of receiving instant adjustment for service, either to screw the pipe or bolt into a threaded hole or fitting or unscrew it therefrom, as occasion may require.

Having thus described my invention, I claim as new and desire to secure by Letters Patent—

1. A wrench, comprising a lever, a hook-shaped head thereon having a recess at its inner side, a chain pivoted by one end to one end of the head, so as to lie in the recess, serrations on one side edge of the chain-links, and means for cramping the chain on a pipe or bolt.

2. A wrench, comprising a lever, a hook-shaped head thereon, a chain secured by one end to the end of the hook, said chain lying on the inner surface of the hook-shaped head, means to detachably secure the chain near the opposite end thereof, and a dog rockable on the lever so as to bear upon the chain between its ends, and cramp it upon a pipe or bolt.

3. A wrench, comprising a lever having a recessed hook-shaped head, a chain secured by one end on the head so as to occupy the recess in the head, a dog pivoted by one end on the lever and having a toe adapted to engage with the chain, and an adjustable clamp rockable on the dog so as to bind the chain on the free end of said dog.

4. A wrench, comprising a lever having a recessed hook-shaped head, a chain composed of main links each of which is formed of a plurality of link-sections, one end of said chain being secured to said head, the chain being adapted to occupy the recess in the head, serrations on the inner edges of the link-sections, a dog having a lateral toe and pivoted by one end on the lever, whereby the toe may rock into contact with the chain, a furcated clamp pivoted on the dog by its legs, leaving a space for the reception of the chain, and a turn-button adapted to hold the clamp alined with the dog.

In testimony whereof I have signed my name to this specification in the presence of two subscribing witnesses.

MARTIN MAHLEN.

Witnesses:
H. A. SHEDD,
LARS CHRISTENSEN.